US 11,988,863 B2

(12) United States Patent
Fattal et al.

(10) Patent No.: US 11,988,863 B2
(45) Date of Patent: May 21, 2024

(54) MULTIBEAM BACKLIGHT, MULTIVIEW DISPLAY, AND METHOD HAVING SHAPED-EDGE MULTIBEAM ELEMENTS

(71) Applicant: LEIA INC., Menlo Park, CA (US)

(72) Inventors: David A. Fattal, Menlo Park, CA (US); Joseph D. Lowney, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/727,735

(22) Filed: Apr. 23, 2022

(65) Prior Publication Data
US 2022/0244449 A1    Aug. 4, 2022

Related U.S. Application Data

(63) Continuation of application No. PCT/US2019/059273, filed on Oct. 31, 2019.

(51) Int. Cl.
F21V 8/00    (2006.01)

(52) U.S. Cl.
CPC ......... *G02B 6/0058* (2013.01); *G02B 6/0055* (2013.01)

(58) Field of Classification Search
CPC ............................. G02B 6/005; G02B 6/003
See application file for complete search history.

(56) References Cited

U.S. PATENT DOCUMENTS

| 5,029,981 A | 7/1991 | Thompson |
| 9,128,226 B2 | 9/2015 | Fattal et al. |
| 9,201,270 B2 | 12/2015 | Fattal et al. |

(Continued)

FOREIGN PATENT DOCUMENTS

| CA | 3035787 A1 | 4/2018 |
| CN | 101595409 A | 12/2009 |

(Continued)

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

(Continued)

*Primary Examiner* — Leah Simone Macchiarolo
(74) *Attorney, Agent, or Firm* — J. Michael Johnson

(57) ABSTRACT

A multibeam backlight and multiview display employ a multibeam element having a shaped edge with a shape configured to disperse spurious diffraction components. The multibeam backlight includes a light guide configured to guide light in a propagation direction and a plurality of multibeam elements spaced apart from one another across the light guide, the multibeam element plurality being configured to scatter out the guided light as emitted light. A multibeam element of the multibeam element plurality includes the shaped edge oriented orthogonal to the propagation direction. The shape of the shaped edge is configured to disperse spurious diffraction components in the emitted light associated with an interaction between the guided light and the multibeam element. The multiview display includes a light valve array configured to modulate the emitted light as a multiview image having a plurality of views in a similar plurality of different view directions.

20 Claims, 9 Drawing Sheets

(56) References Cited

U.S. PATENT DOCUMENTS

| | | |
|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,345,505 B2 | 7/2019 | Fattal |
| 10,649,128 B2 | 5/2020 | Fattal et al. |
| 10,705,281 B2 | 7/2020 | Fattal et al. |
| 10,798,371 B2 | 10/2020 | Fattal |
| 10,810,917 B2 | 10/2020 | Fattal |
| 10,830,939 B2 | 11/2020 | Fattal et al. |
| 10,838,134 B2 | 11/2020 | Fattal et al. |
| 10,884,175 B2 | 1/2021 | Fattal |
| 10,928,677 B2 | 2/2021 | Aieta et al. |
| 10,948,647 B2 | 3/2021 | Fattal |
| 10,969,531 B2 | 4/2021 | Fattal et al. |
| 11,016,235 B2 | 5/2021 | Fattal et al. |
| 11,143,811 B2 | 10/2021 | Fattal et al. |
| 2008/0225393 A1 | 9/2008 | Rinko |
| 2009/0322986 A1 | 12/2009 | Wei et al. |
| 2012/0200807 A1 | 8/2012 | Wei et al. |
| 2013/0169518 A1 | 7/2013 | Wu et al. |
| 2017/0307800 A1 | 10/2017 | Fattal |
| 2017/0363794 A1* | 12/2017 | Wan ................. G02B 30/33 |
| 2019/0025494 A1 | 1/2019 | Fattal et al. |
| 2020/0018886 A1 | 1/2020 | Fattal et al. |
| 2020/0064552 A1 | 2/2020 | Fattal |
| 2021/0240005 A1 | 8/2021 | Fattal et al. |

FOREIGN PATENT DOCUMENTS

| | | |
|---|---|---|
| CN | 201811152 U | 4/2011 |
| CN | 104460115 A | 3/2015 |
| CN | 108604019 A | 9/2018 |
| CN | 108885309 A | 11/2018 |
| JP | 2009295598 A | 12/2009 |
| JP | 4470388 B2 | 6/2010 |
| KR | 20090108588 A | 10/2009 |
| KR | 20180101356 A | 9/2018 |
| KR | 20190051991 A | 5/2019 |
| WO | 2012038856 A1 | 3/2012 |
| WO | WO-2017131807 A1 | 8/2017 |
| WO | WO-2017164871 A1 | 9/2017 |
| WO | 2021006915 A1 | 1/2021 |
| WO | 2021040683 A1 | 3/2021 |
| WO | 2021050694 A1 | 3/2021 |
| WO | 2021150658 A1 | 7/2021 |
| WO | 2021151009 A1 | 7/2021 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

International Search Report and Written Opinion (ISRWO) from the International Searching Authority (ISA/KR) dated Aug. 28, 2020 (11 pages) for counterpart parent PCT Application No. PCT/US2019/059273.

"Canadian Application Serial No. 3,156,349, Examiners Rule 86(2) Report mailed Feb. 21, 2024", 5 pgs.

"Chinese Application Serial No. 201980101741.X, Offfce Action mailed Jan. 31, 2024", w/English Translation, 22 pgs.

"Korean Application Serial No. 10-2022-7013547, Notice of Preliminary Rejection mailed Jan. 23, 2024", w/ English Translation, 12 pgs.

* cited by examiner

MULTIBEAM BACKLIGHT, MULTIVIEW DISPLAY, AND METHOD HAVING SHAPED-EDGE MULTIBEAM ELEMENTS

CROSS-REFERENCE TO RELATED APPLICATIONS

This application is a continuation patent application of and claims priority to International Patent Application No. PCT/US2019/059273, filed Oct. 31, 2019, the contents of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide multibeam backlighting configured to disperse spurious diffraction components in emitted light with application to electronic displays. In various embodiments consistent with the principles herein, a multibeam backlight includes a plurality of multibeam elements configured to provide emitted light is provided. The multibeam elements comprise a shaped edge oriented orthogonal to the propagation direction. A shape of the shaped edge is configured to disperse spurious diffraction components in the emitted light associated with an interaction between the guided light and the multibeam element. Dispersing spurious diffraction components may mitigate or even eliminate striping associated with a light source of the multibeam backlight, according to some embodiments.

Herein, a 'multiview display' is defined as an electronic display or display system configured to provide different views of a multiview image in different view directions.

Figure 1A:
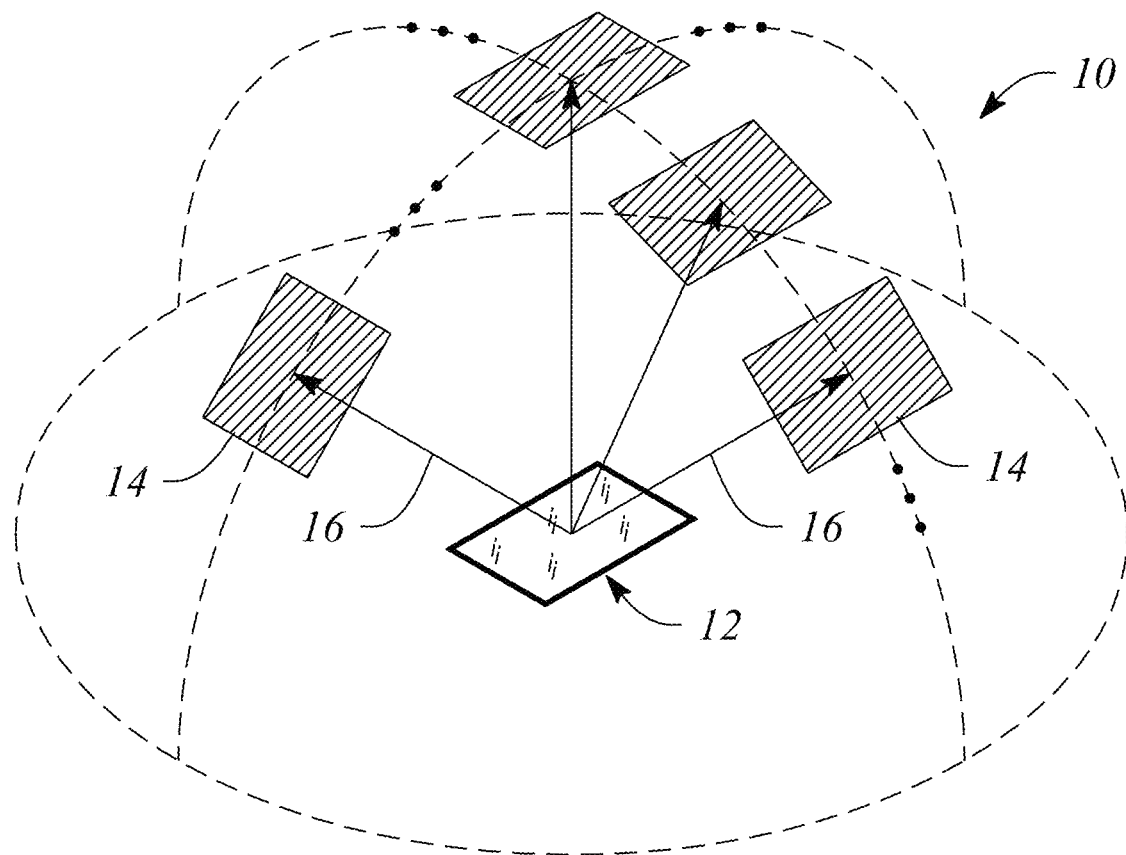
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 configured to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a directional light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen) while the azimuth angle $\varphi$ is an angle in a horizontal plane (e.g., parallel to the multiview display screen plane).

Figure 1B:
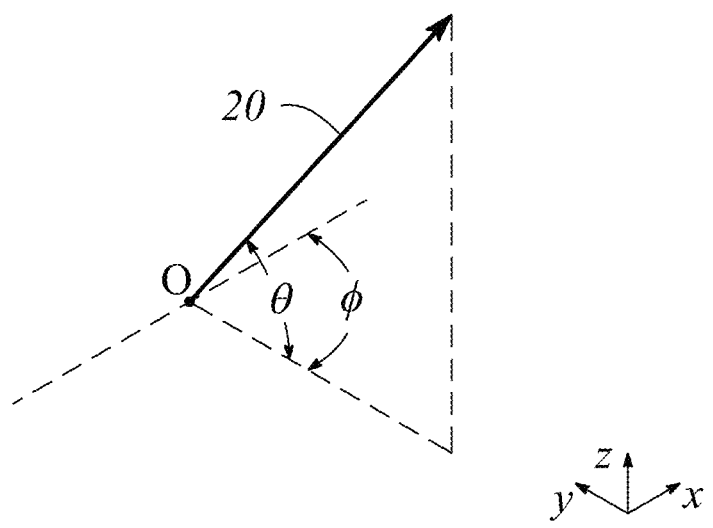
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein may be explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

By definition herein, a 'multibeam element' is a structure or element of a backlight or a display that produces light that includes a plurality of directional light beams. Directional light beams of the plurality of directional light beams (or 'directional light beam plurality') produced by a multibeam element have different principal angular directions from one another, by definition herein. In particular, by definition, a directional light beam of the directional light beam plurality has a predetermined principal angular direction that is different from another directional light beam of the directional light beam plurality. According to some embodiments, a size of the multibeam element may be comparable to a size of a light valve used in a display that is associated with the multibeam element (e.g., a multiview display). In particular, the multibeam element size may be between about one half and about two times the light valve size, in some embodiments. In some embodiments, a multibeam element may provide polarization-selective scattering.

According to various embodiments, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various directional light beams in the directional light beam plurality are determined by a characteristic including, but not limited to, a size (e.g., one or more of length, width, area, and etc.) of the multibeam element along with other characteristics. For example, in a diffractive multibeam element, a 'grating pitch' or a diffractive feature spacing and an orientation of a diffraction grating within diffractive multibeam element may be characteristics that determine, at least in part, the different principal angular directions of the various directional light beams. Likewise, a slope and an orientation of a reflective surface in a reflective multibeam element may be among the characteristics that determine, at least in part, the different principal angular directions of the various directional light beams. In some embodiments, the multibeam element may be considered an 'extended point light source', i.e., a plurality of point light sources distributed across an extent of the multibeam element, by definition herein. Further, a directional light beam produced by the multibeam element may have a principal angular direction given by angular components $\{\theta, \varphi\}$, as described below with respect to FIG. 1B.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
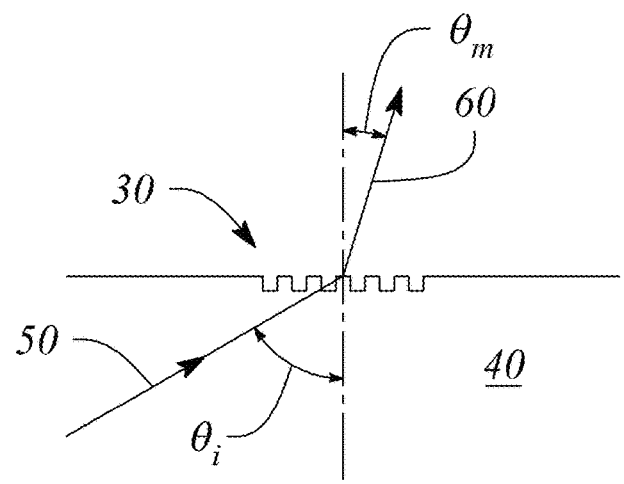
FIG. 2 illustrates a cross-sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example. In some embodiments, a feature spacing or pitch of the diffraction grating may be less than about a wavelength of light incident on the diffraction grating. As such, the diffraction grating may be a sub-wavelength diffraction grating.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/-$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a diffraction grating' means one or more diffraction grating and as such, 'the diffraction grating' means 'diffraction grating(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
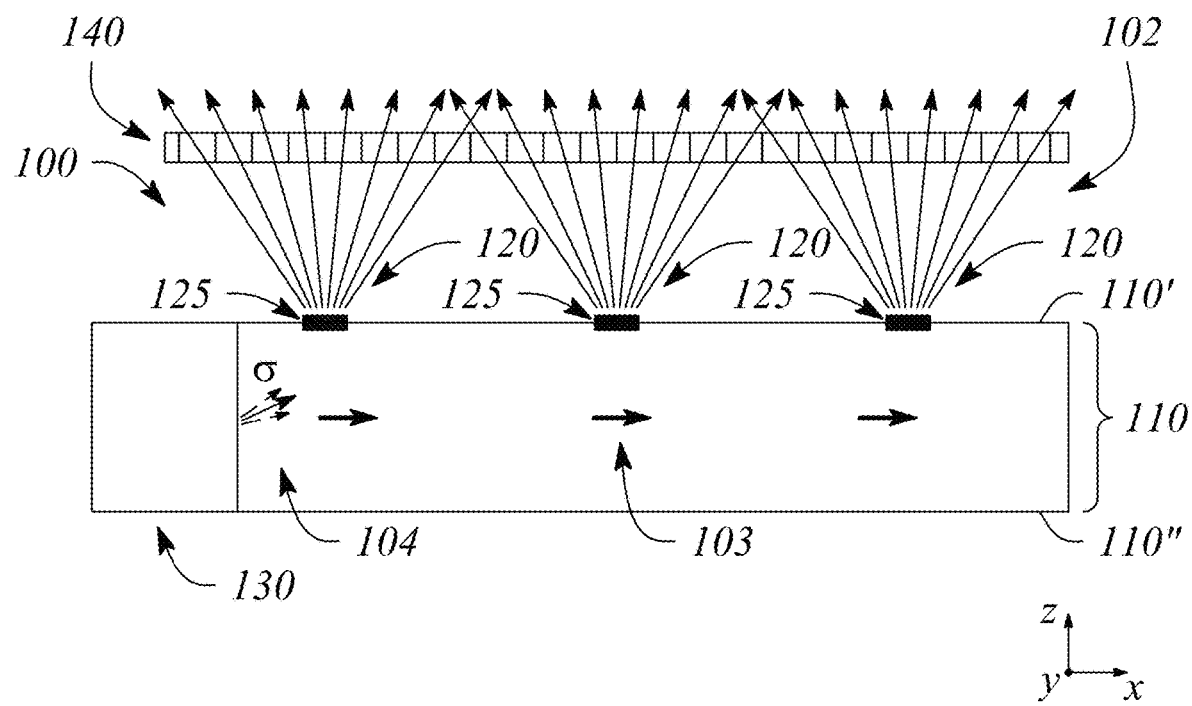
FIG. 3A illustrates a cross-sectional view of a multibeam backlight in an example, according to an embodiment consistent with the principles described herein.
Figure 3B:
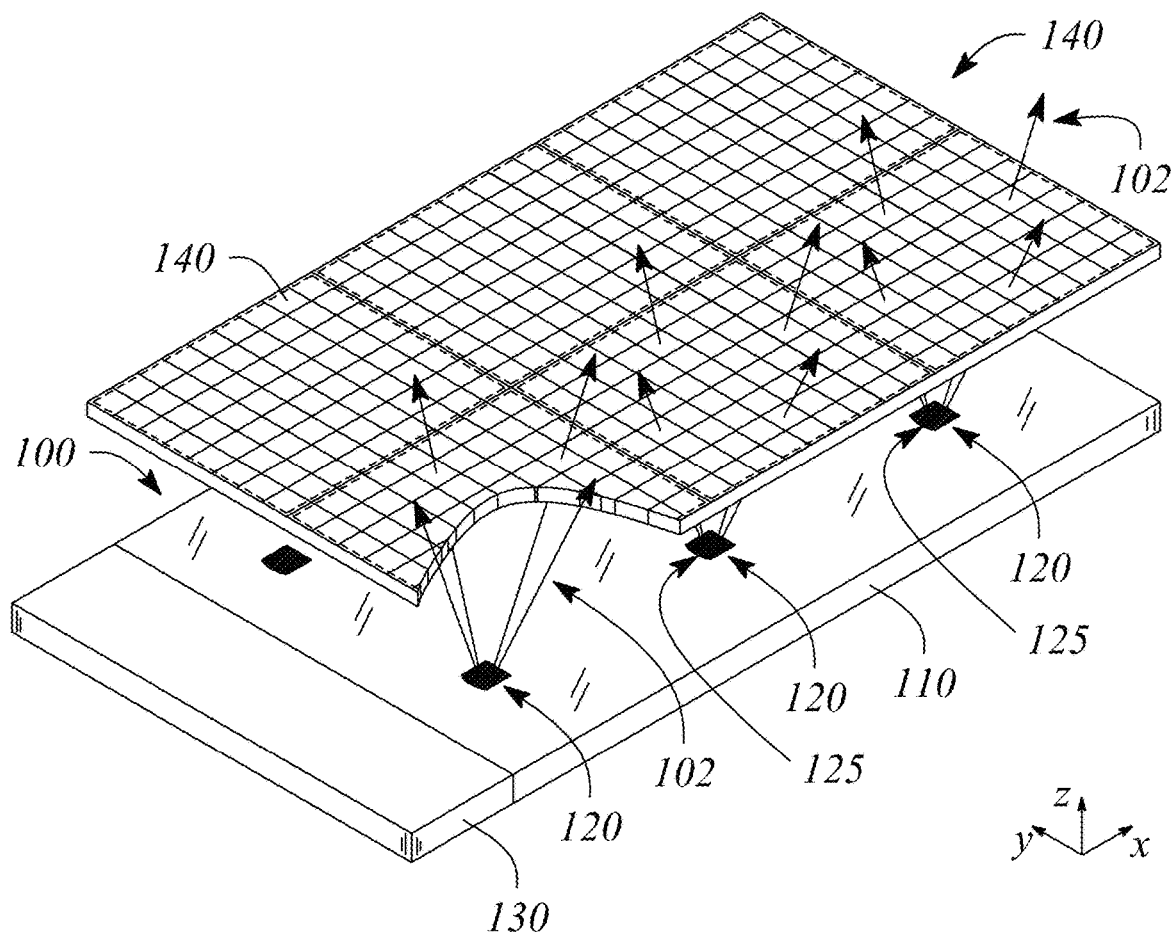
FIG. 3B illustrates a perspective view of the multibeam backlight in an example, according to an embodiment consistent with the principles described herein.

According to some embodiments of the principles described herein, a multibeam backlight is provided. FIG. 3A illustrates a cross-sectional view of a multibeam backlight 100 in an example, according to an embodiment consistent with the principles described herein. FIG. 3B illustrates a perspective view of the multibeam backlight 100 in an example, according to an embodiment consistent with the principles described herein. The perspective view in FIG. 3B is illustrated with a partial cut-away to facilitate discussion herein only.

As illustrated in FIGS. 3A and 3B, the multibeam backlight 100 is configured to emit light as emitted light 102. In particular, the emitted light 102 comprises a plurality of directional light beams having different principal angular directions from one another. In some embodiments, the different principal angular directions of directional light beams in the directional light beam plurality correspond to different view directions of different views of a multiview display that employs or includes the multibeam backlight 100.

The multibeam backlight 100 illustrated in FIGS. 3A-3B comprises a light guide 110. The light guide 110 is configured to guide light along a length of the light guide as guided light 104 (i.e., a guided light beam). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate of an optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the first surface and the second surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., front or top surface or side) and a second surface 110" (e.g., back or bottom surface or side) of the light guide 110. In particular, the guided light 104 propagates by reflecting or 'bouncing' between the first surface 110' and the second surface 110" of the light guide 110 at the non-zero propagation angle. In some embodiments, the guided light 104 may comprise a plurality of guided light beams comprising different colors of light may be guided by the light guide 110 at respective ones of different color-specific, non-zero propagation angles. In some embodiments, the guided light may be collimated or may be a collimated light beam. In particular, the guided light may be collimated according to or having a collimation factor σ, in various embodiments. Note, the non-zero propagation angle is not illustrated in FIG. 3A for simplicity of illustration. However, a bold arrow depicting a propagation direction 103 illustrates a general propagation direction of the guided light 104 along the light guide length in FIG. 3A.

As illustrated in FIGS. 3A-3B, the multibeam backlight 100 further comprises a plurality of multibeam elements 120 spaced apart from one another along the light guide length. In particular, the multibeam elements 120 of the plurality are separated from one another by a finite space and represent individual, distinct elements along the light guide length. That is, by definition herein, the multibeam elements 120 of the plurality are spaced apart from one another according to a finite (i.e., non-zero) inter-element distance (e.g., a finite center-to-center distance). Further, the multibeam elements 120 of the plurality generally do not intersect, overlap or otherwise touch one another, according to some embodiments. As such, each multibeam element 120 of the multibeam element plurality is generally distinct and separated from other ones of the multibeam elements 120 in the multibeam element plurality.

According to some embodiments, the multibeam elements 120 of the multibeam element plurality may be arranged in either a one-dimensional (1D) array or a two-dimensional (2D) array. For example, the multibeam elements 120 may be arranged as a linear 1D array. In another example, the multibeam elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 120 may be substantially uniform or constant across the array. In other examples, the inter-element distance between the multibeam elements 120 may be varied one or both of across the array and along the length of the light guide 110.

The multibeam elements 120 of the plurality may be located at, on, or adjacent to a first surface 110' of the light guide 110, e.g., as illustrated in FIGS. 3A and 3B by way of example and not limitation. In other embodiments (not illustrated), the multibeam elements 120 of the plurality may be located at or adjacent to a second surface 110" of the light guide 110. In some embodiments (not illustrated), multibeam elements 120 of the plurality may be located inside the light guide 110 between the first surface 110' and the second surface 110".

According to various embodiments, a multibeam element 120 of the multibeam element plurality is configured to scatter out the guided light (or a portion thereof) as the emitted light 102. In particular, the guided light 104 may be scattered out by the multibeam element 120 as the emitted light 102 comprising a plurality of directional light beams having different principal angular directions. The different principal angular directions of the plurality of light beams may correspond to respective different view directions of a multiview display, for example. In particular, FIGS. 3A and 3B illustrate the directional light beams of the emitted light 102 as a plurality of diverging arrows depicted as being directed way from the first (or top) surface 110' of the light guide 110.

Further, according to various embodiments consistent with the principles described herein, a multibeam element 120 of the multibeam element plurality has a shaped edge 125. Herein, a 'shaped edge' is defined as an edge that is not formed of a single straight line, i.e., an edge that generally has a shape other than that of a continuous straight line. Further, by definition herein, the shaped edge 125 is an edge of the multibeam element 120 that is oriented orthogonal or at least substantially orthogonal to the propagation direction 103 of the guided light 104. In some embodiments, the shaped edge 125 may comprise plurality of sections having intersecting tangents oblique to the propagation direction of the guided light 104 within the light guide 110. According to various embodiments, the shaped edge of the multibeam element 120 may have any of a variety of shapes including, but not limited to, a simple curved shape (e.g., a convex or a concave arc or curve), a complex curved shape (e.g., a sinusoidal shape, a spline shape, another piecewise polynomial shape), a plurality of intersecting straight lines (e.g., triangular or sawtooth shape), or even an arbitrary or random curved shape. According to various embodiments, a shape of the shaped edge 125 of the multibeam element 120 is configured to disperse spurious diffraction components in the emitted light 102 associated with an interaction between the guided light 104 and the multibeam element 120, according to various embodiments.

Figure 4A:
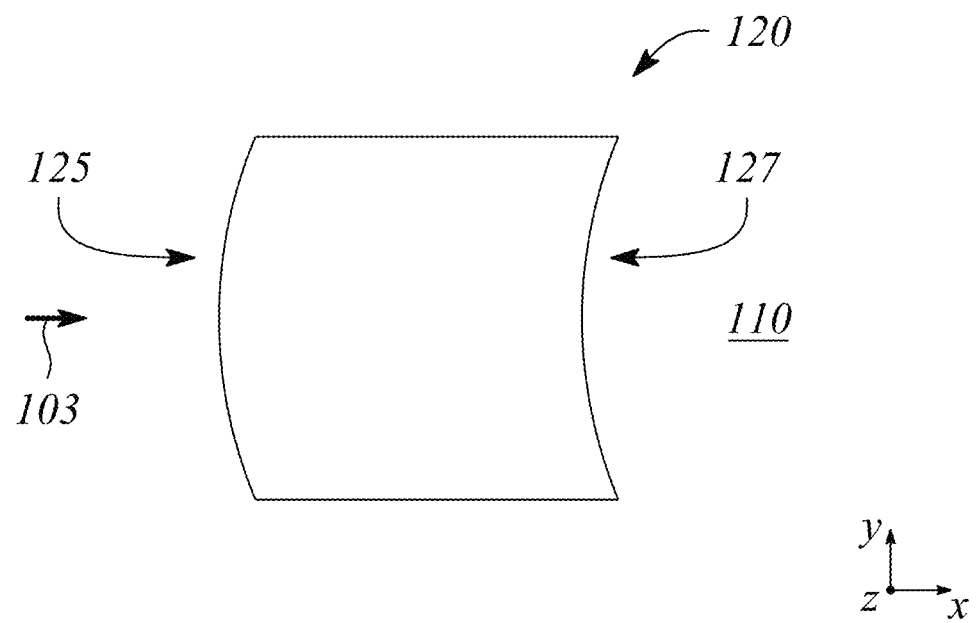
FIG. 4A illustrates a plan view of a multibeam element having a shaped edge in an example, according to an embodiment consistent with the principles described herein.

FIG. 4A illustrates a plan view of a multibeam element 120 having a shaped edge 125 in an example, according to an embodiment consistent with the principles described herein. As illustrated, the multibeam element 120 is located on a surface of the light guide 110 and comprises four edges, by way of example and not limitation. Two opposing edges of the four edges of the multibeam element 120 illustrated in FIG. 4A are parallel to one another and also substantially parallel to the propagation direction 103 of the guided light. A third edge oriented substantially orthogonal to the guided light propagation direction 103 is the shaped edge 125 of the multibeam element 120, as illustrated. In FIG. 4A, the shaped edge 125 has a convex curved shape (i.e., a simple curved shape). The convex curved shape of the shaped edge 125 of the multibeam element 120 is oriented generally along an y-direction, while the propagation direction 103 is in an x-direction, as illustrated.

Figure 4B:
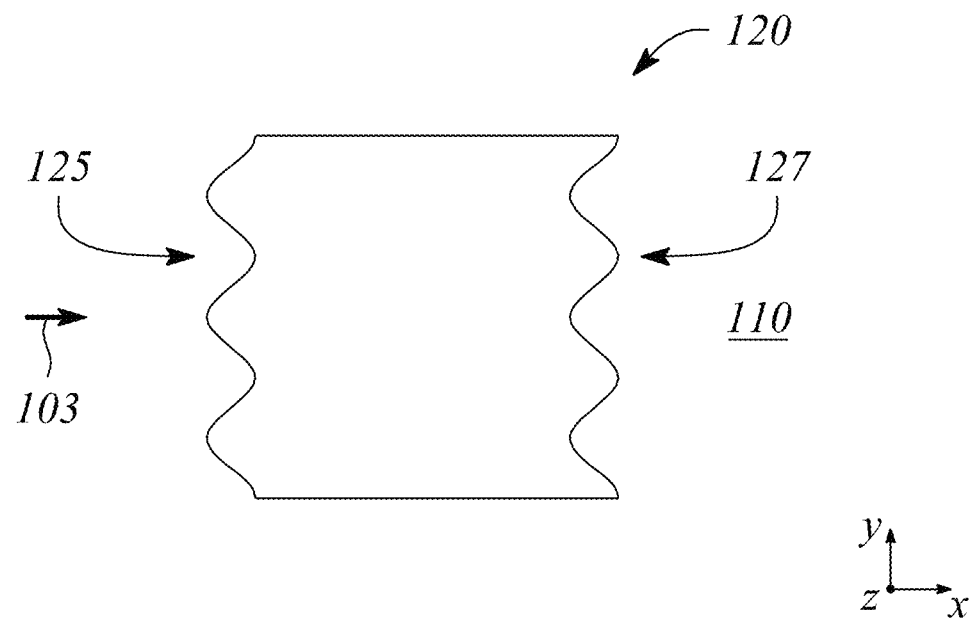
FIG. 4B illustrates a plan view of a multibeam element having a shaped edge in an example, according to another embodiment consistent with the principles described herein.

FIG. 4B illustrates a plan view of a multibeam element 120 having a shaped edge 125 in an example, according to another embodiment consistent with the principles described herein. In particular, FIG. 4B illustrates the shaped edge 125 of the multibeam element 120 as having a sinusoidal shape (i.e., a complex curved shape).

Figure 4C:
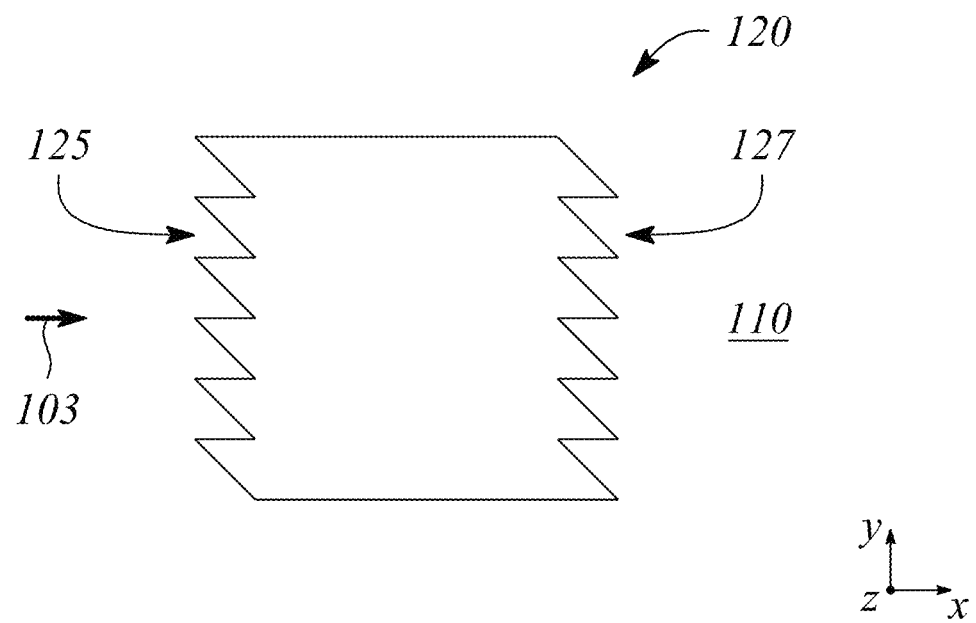
FIG. 4C illustrates a plan view of a multibeam element having a shaped edge in an example, according to another embodiment consistent with the principles described herein.

FIG. 4C illustrates a plan view of a multibeam element 120 having a shaped edge 125 in an example, according to yet another embodiment consistent with the principles described herein. In FIG. 4C, the shaped edge 125 comprises a plurality of straight sections that are oblique to the propagation direction 103. In particular, the shaped edge 125 illustrated in FIG. 4C represents a triangular or sawtooth shape.

Figure 4D:
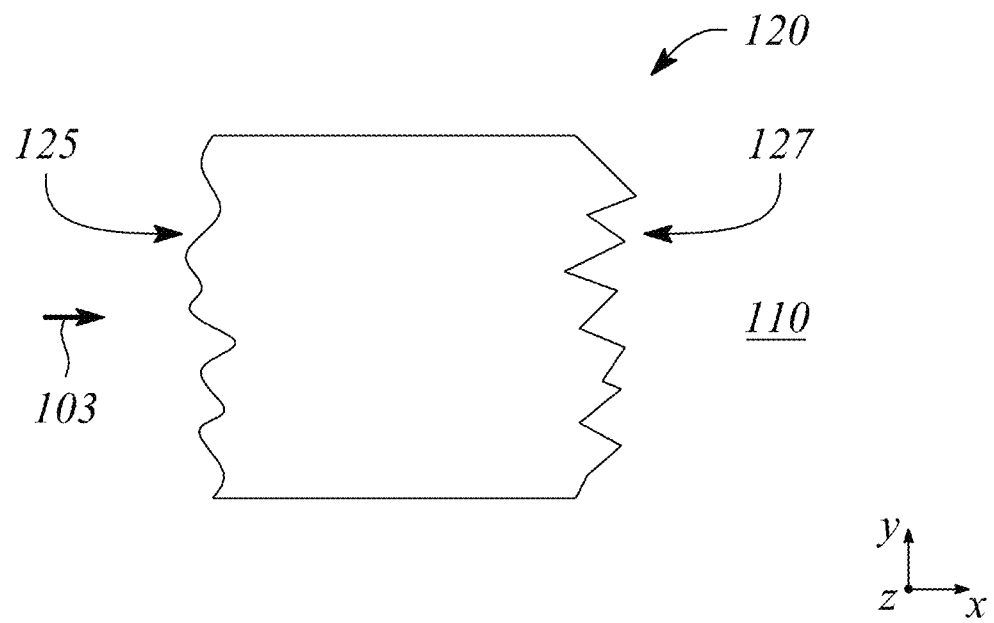
FIG. 4D illustrates a plan view of a multibeam element having a shaped edge in an example, according to yet another embodiment consistent with the principles described herein.

FIG. 4D illustrates a plan view of a multibeam element 120 having a shaped edge 125 in an example, according to yet another embodiment consistent with the principles described herein. In FIG. 4D, the shaped edge 125 comprises a shaped edge 125 having a random shape with a plurality of sections that are oblique to the propagation direction. In particular, the shaped edge 125 illustrated in FIG. 4D represents a smooth random shape.

In some embodiments (e.g., as illustrated in FIGS. 4A-4D), the multibeam element 120 may further comprise another shaped edge 127 at an edge of the multibeam element that is opposite the shaped edge 125. The shaped edge 127 may have the same shape as the shaped edge 125 such that the shaped edges 125 and 127 are piecewise parallel to one another, in some embodiments. Thus, as illustrated in FIG. 4A, the shaped edge 127 has a concave curved shape that is parallel to the convex curve of the shaped edge 125. Similarly, FIGS. 4B-4D also illustrate another shaped edge 127 opposite to the shaped edge 125. In FIG. 4B, the other shaped edge 127 has a sinusoidal shape, while in FIG. 4C the other shaped edge 127 has a triangular or sawtooth shape, by way of example and not limitation. In FIG. 4D, the other shaped edge 127 has a jagged random shape comprising a plurality of oblique straight-line segments. In some embodiments, the shaped edges 125, 127 at opposite sides of the multibeam element 120 may have same or similar shapes, e.g., as illustrated in FIG. 4A-4C. In other embodiments, the shaped edge 125 and the other shaped edge 127 have different shapes from one another. For example, FIG. 4D illustrates the shaped edge 125 having a smooth random shape, while the other shaped edge 127 has a jagged random shape. In another non-limiting example, the shaped edge 125 may have a sinusoidal shape, while the other shaped edge 127 may have a simple curved shape or a triangular shape.

As mentioned above and regardless of a specific shape, the shape of the shaped edge 125, 127 of the multibeam element 120 is configured to disperse spurious diffraction components in the emitted light 102 associated with an interaction between the guided light 104 and the multibeam element 120. In particular, when guided light 104 interacts with a multibeam element 120, the multibeam element 120 is configured to scatter out a portion of the guided light 104 as emitted light 102, as was previously described. Further, another portion of the guided light 104 may be diffracted as spurious diffraction components, especially by edges of the multibeam element 120 that are orthogonal to the propagation direction 103 of the guided light 104. The spurious diffraction components produced by the interaction of the guided light 104 and an edge of the multibeam element 120 that is orthogonal to the propagation direction 103 of the guided light 104 may be emitted away from the light guide 110. Further, the spurious diffraction components emitted from an edge orthogonal to the propagation direction 103 tend to propagate away from the light guide in a vertical plane orthogonal to a surface of the light guide 110 and parallel to the propagation direction 103. According to various embodiments, the shaped edge 125, 127 may serve to minimize the length of the multibeam element edge that is orthogonal to the direction of propagation 103 of the guided light 104, and therefore to disperse such spurious diffraction component beyond the vertical plane parallel to the propagation direction 103, i.e., x-z plane as illustrated.

In various embodiments, the multibeam element 120 of the multibeam backlight 100 may comprise any of a number of different scattering structures configured to scatter out a portion of the guided light 104 as emitted light comprising the directional light beams 202. For example, the different scattering structures may include, but are not limited to, diffraction gratings, micro-reflective elements, micro-refractive elements, or various combinations thereof. In some embodiments, the multibeam element 120 comprising a diffraction grating is configured to diffractively scatter out the guided light portion as the plurality of directional light beams. In other embodiments, the multibeam element 120 comprising a micro-reflective element is configured to reflectively scatter out the guided light portion as the plurality of directional light beams, or the multibeam element 120 comprising a micro-refractive element is configured to scatter out the guided light portion as the plurality of directional light beams by or using refraction (i.e., refractively scatter out the guided light portion).

Figure 5A:
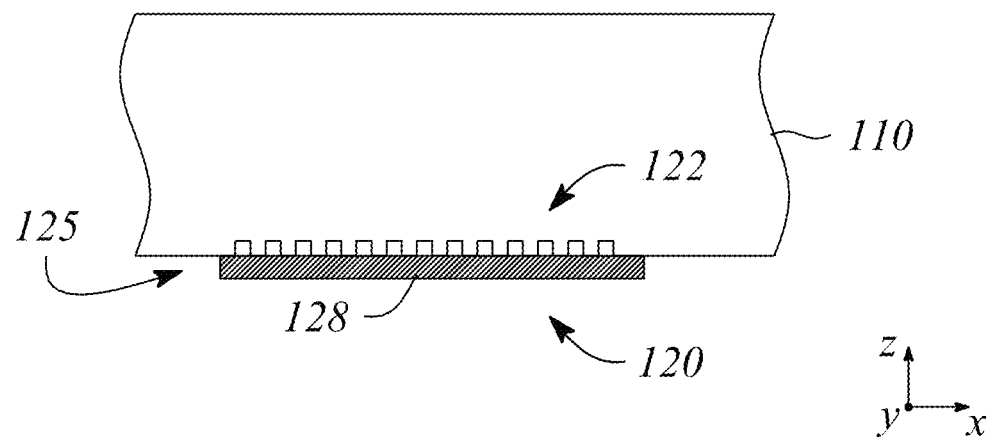
FIG. 5A illustrates a cross sectional view of a multibeam element having a shaped edge in an example, according to an embodiment consistent with the principles described herein.
Figure 5B:
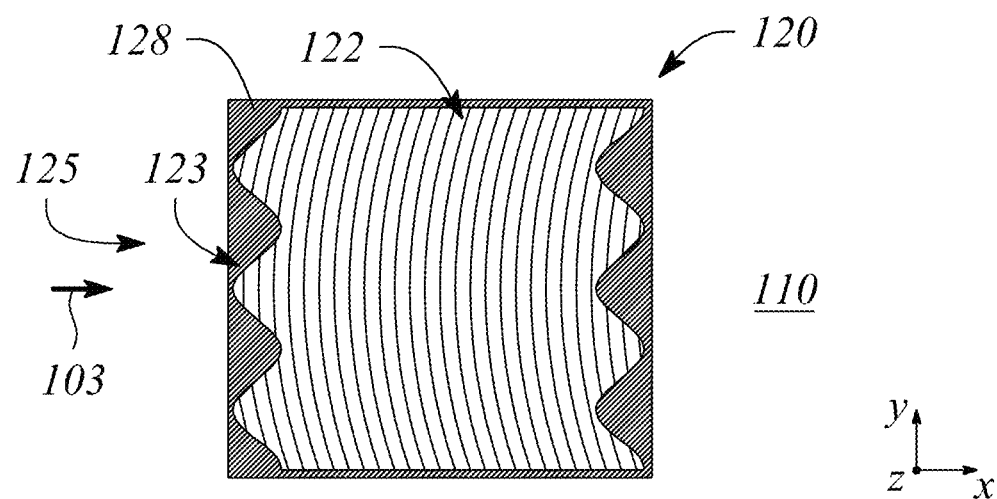
FIG. 5B illustrates a plan view of a multibeam element having a shaped edge in an example, according to an embodiment consistent with the principles described herein.
Figure 5C:
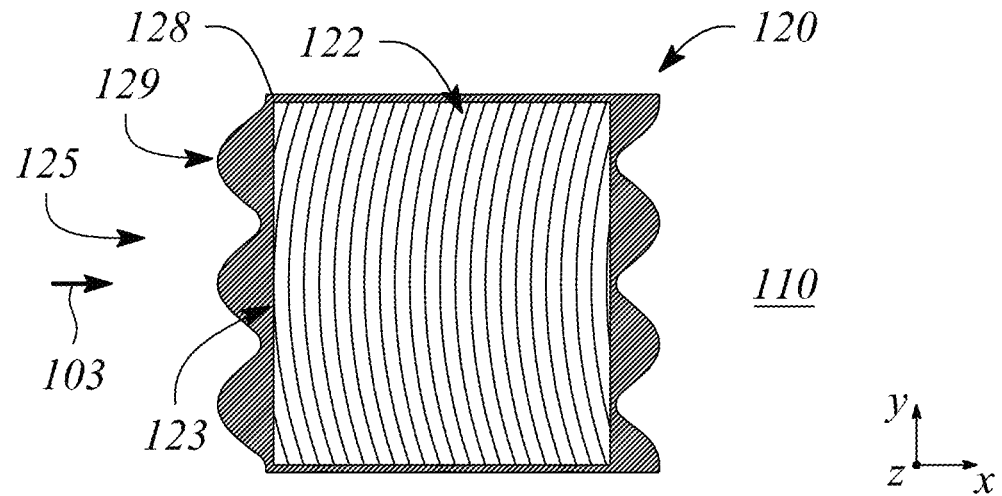
FIG. 5C illustrates a plan view of a multibeam element having a shaped edge in an example, according to another embodiment consistent with the principles described herein.
Figure 5D:
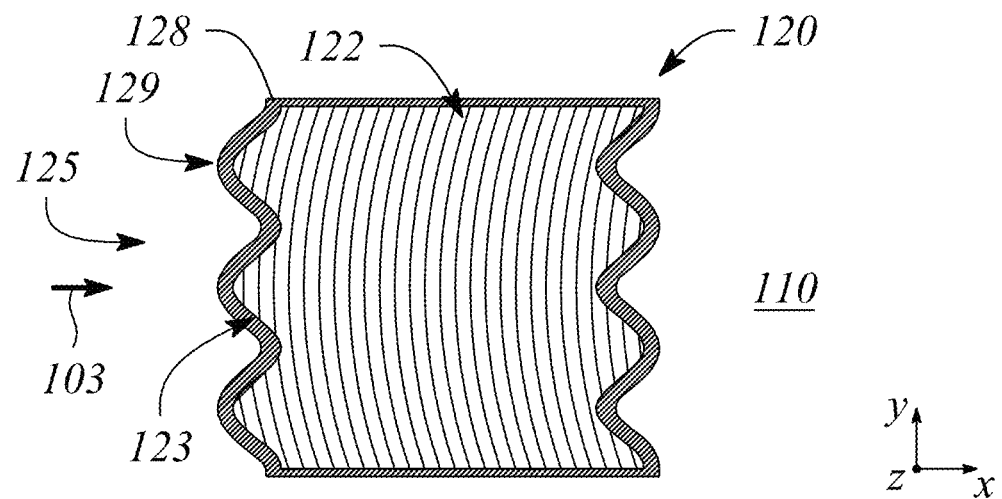
FIG. 5D illustrates a plan view of multibeam element having a shaped edge in an example, according to yet another embodiment consistent with the principles described herein.

In some embodiments, the multibeam element 120 comprises a scattering structure and a reflective island aligned with the scattering structure and having a comparable size. That is, the reflective island may be co-extensive with the scattering structure, according to various embodiments. FIG. 5A illustrates a cross sectional view of a multibeam element 120 having a shaped edge 125 in an example, according to an embodiment consistent with the principles described herein. FIG. 5B illustrates a plan view of a multibeam element 120 having a shaped edge 125 in an example, according to an embodiment consistent with the principles described herein. FIG. 5C illustrates a plan view of a multibeam element 120 having a shaped edge 125 in an example, according to another embodiment consistent with the principles described herein. FIG. 5D illustrates a plan view of multibeam element 120 having a shaped edge 125 in an example, according to yet another embodiment consistent with the principles described herein.

In particular, the multibeam element 120 illustrated in FIGS. 5A-5D comprises a scattering structure 122 and a reflective island 128 aligned and co-extensive with or having a comparable size to the scattering structure 122. For example, the scattering structure 122 may comprise a diffraction grating located at a surface of the light guide 110, e.g., the second surface 110", as illustrated by way of example and not limitation in FIGS. 5A-5D. According to various embodiments, the reflective island 128 may comprise one or more of, but is not limited to, a reflective metal material (e.g., a metal layer or film), various polymer-metal composites (e.g., an aluminum-polymer layer or film), a Bragg reflector, an enhanced specular reflectors film (ESR), or any of a variety of other reflective materials and material layers or film that provide optical reflection. Note that, while the scattering structure 122 illustrated in FIGS. 5A-5D comprises a diffraction grating, other scattering structures such as a micro-reflective structure or a micro-refractive structure may be employed as scattering structure 122, according to various embodiments.

As illustrated in FIG. 5B, the multibeam element 120 further comprises a shaped edge 125 having a shape that is configured to disperse spurious diffraction components in the emitted light 102 associated with an interaction between the guided light and the multibeam element 120. In particular, the shaped edge 125 of the multibeam element 120 comprises an edge 123 of the scattering structure 122, as illustrated in FIG. 5B. Further, the edge 123 of the scattering structure 122 comprises a plurality of sections having intersection tangents oblique to the propagation direction 103 of the guided light 104 within the light guide 110. As illustrated in FIG. 5B, the edge 123 of the scattering structure 122 has a sinusoidal shape, by way of example and not limitation. Further, the shaped edge of the multibeam element 120 illustrated in FIG. 5B does not include an edge of the reflective island 128. That is, the reflective island 128 has a straight edge, as illustrated in the example of FIG. 5B.

In FIG. 5C, the shaped edge 125 of the multibeam element 120 comprises an edge 129 of the reflective island 128, instead of an edge of the scattering structure 122. That is, the edge of the scattering structure 122 illustrated in FIG. 5C is substantially straight, by way of example and not limitation. To that end, the edge 129 of the reflective island 128 comprises a plurality of sections having intersection tangents oblique to the propagation direction 103 of the guided light within the light guide. As illustrated in FIG. 5C, the edge 123 of the scattering structure 122 is substantially straight, while the edge 129 of the reflective island 128 which serves as the shaped edge 125 of the multibeam element 120 has a sinusoidal shape, by way of example and not limitation.

The multibeam element 120 illustrated in FIG. 5D comprises a scattering structure 122 (illustrated as a diffraction grating 122) and a reflective island 128 aligned with the scattering structure 122. In particular, the shaped edge 125 of the multibeam element 120 comprises both an edge 123 of the scattering structure 122 and an edge 129 of the reflective island 128. As such, both the edge 123 of the scattering structure 122 and the edge 129 of the reflective island 128 are configured to disperse the spurious diffraction components in the emitted light 102. As illustrated, each of the edges 123 and 129 comprises a plurality of sections having intersection tangents oblique to the propagation direction 103 of the guided light within the light guide 110. In some embodiments, such as is illustrated in FIG. 5D, the edge 123 of the scattering structure 122 and the edge 129 of the reflective island 128 may have the same shape. In other embodiments (not illustrated), the shapes of the edges 123 and 129 may be different from one another. In FIG. 5D, the edges 123, 129 respectively of the scattering structure 122 and the reflective island 128 have a sinusoidal shape, by way of example and not limitation.

In some embodiments, the multibeam element 120 further comprises a plurality of scattering structures 122. Further, scattering structures 122 of the scattering structure plurality may be independent from and adjacent to one another and arranged in an array of scattering structures 122 within the multibeam element 120, for example. Moreover, each of the scattering structures 122 may comprise or have a shaped edge 123, in some embodiments.

Figure 6A:
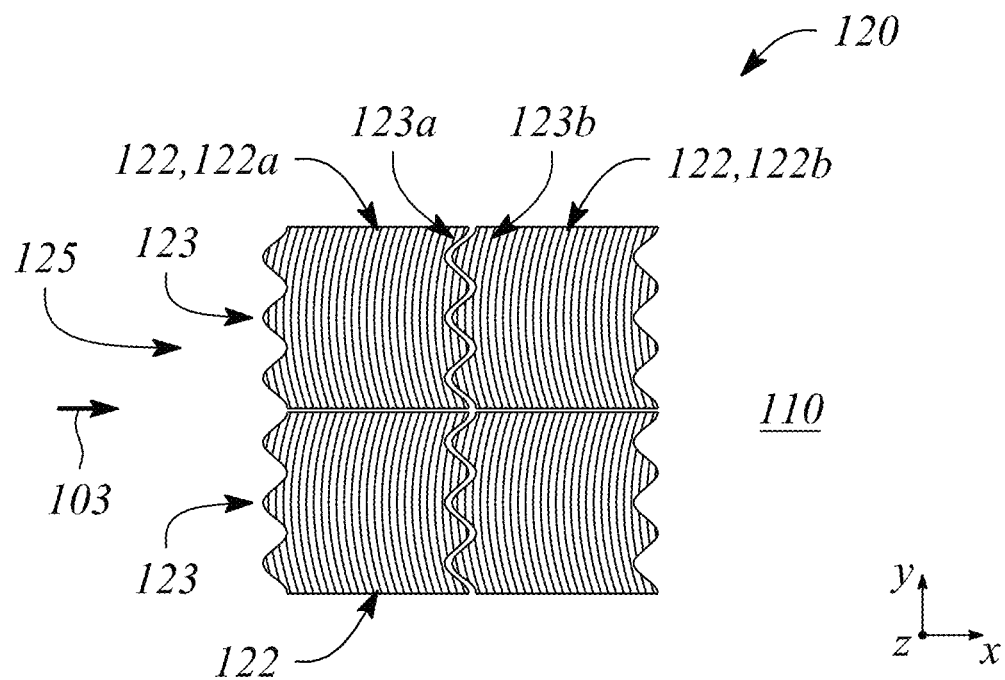
FIG. 6A illustrates a multibeam element comprising a plurality of scattering structures in an example, according to an embodiment consistent with the principles describes herein.
Figure 6B:
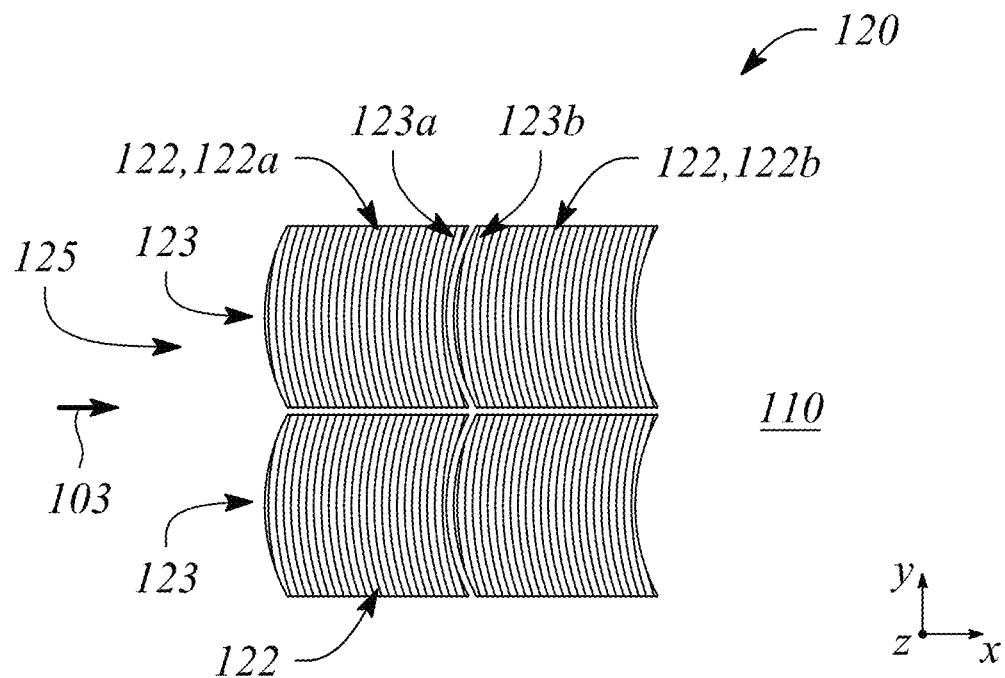
FIG. 6B illustrates another multibeam element comprising a plurality of scattering structures in an example, according to an embodiment consistent with the principles describes herein.

FIG. 6A illustrates a multibeam element 120 comprising a plurality of scattering structures 122 in an example, according to an embodiment consistent with the principles describes herein. FIG. 6B illustrates another multibeam element 120 comprising a plurality of scattering structures 122 in an example, according to an embodiment consistent with the principles describes herein. As illustrated in FIGS. 6A-6B, the plurality of scattering structures 122 comprises a first scattering structures 122a and a second scattering structures 122b within the multibeam element 120 on a surface of or within (i.e., between surfaces of) a light guide 110. Each scattering structure 122 may have a edge 123 having a shape that together combine to serve as the shaped edge 125 of the multibeam element 120, according to various embodiments. In particular, the edge 123 of each of the scattering structures 122 of the scattering structure plurality has a shape that is configured to disperse spurious diffraction components in the emitted light 102 associated with an interaction between the guided light 104 and the multibeam element 120. As such, the shapes of the edges 123 collectively function as the shaped edge 125.

Further, as illustrated, a first scattering structure 122a is independent from and adjacent to a second scattering structure 122b within the multibeam element 120. The scattering structures 122 are thus arranged in an array of scattering structures 122 within the multibeam element 120. In some embodiments (e.g., as illustrated), a shaped edge 123a of the first scattering structure 122a adjacent to a shaped edge 123b of the second scattering structure 122b may have complimentary shape. That is, shapes of the shaped edges 123a, 123b may be complementary to one another, e.g., as illustrated. This configuration with complementary edge shapes may enable the scattering structures 122 (e.g., diffraction gratings) of the multibeam element 120 to be tiled as an array within the multibeam element 120, according to some embodiments (e.g., as illustrated).

Referring back to FIGS. 3A-3B, the multibeam backlight 100 may further comprise a light source 130. According to various embodiments, the light source 130 is configured to provide the light to be guided within light guide 110. In particular, the light source 130 may be located adjacent to an entrance surface or end (input end) of the light guide 110. In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 130 may be a substantially broadband light source configured to provide substantially broadband or polychromatic light. For example, the light source 130 may provide white light. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 130 comprises a plurality of optical emitters and the shaped edge 125 is configured to mitigate striping associated with the light source 130. Stripping with such light sources may be caused by the spurious diffraction components in the emitted light 102 associated with an interaction between the guided light and the multibeam element 120 in conjunction with light originating at each of the optical emitters, for example. In particular, the spurious diffraction components caused by straight edges orthogonal to the direction of propagation of the guided light 104 propagate in a pattern consistent with a pattern of straight edges of the plurality of multibeam elements 120.

As mentioned above, the emitted light 102 may comprise a plurality of directional light beams, according to various embodiments. Further, the directional light beam may have directions corresponding to view directions of a multiview image, in some embodiments. In some embodiments, a size of the multibeam element 120 is comparable to a size of a light valve 140 of an array of light valves used modulate the directional light beams to provide the multiview image. In some embodiments, the size of the multibeam element 120 is comparable to the light valve size such that the multibeam element size is between about fifty percent (50%) and about two hundred percent (200%) of the light valve size. FIGS. 3A-3B illustrate the array of light valves 140 that may be part of a multiview display the employs the multibeam backlight 100, for example.

Figure 7:
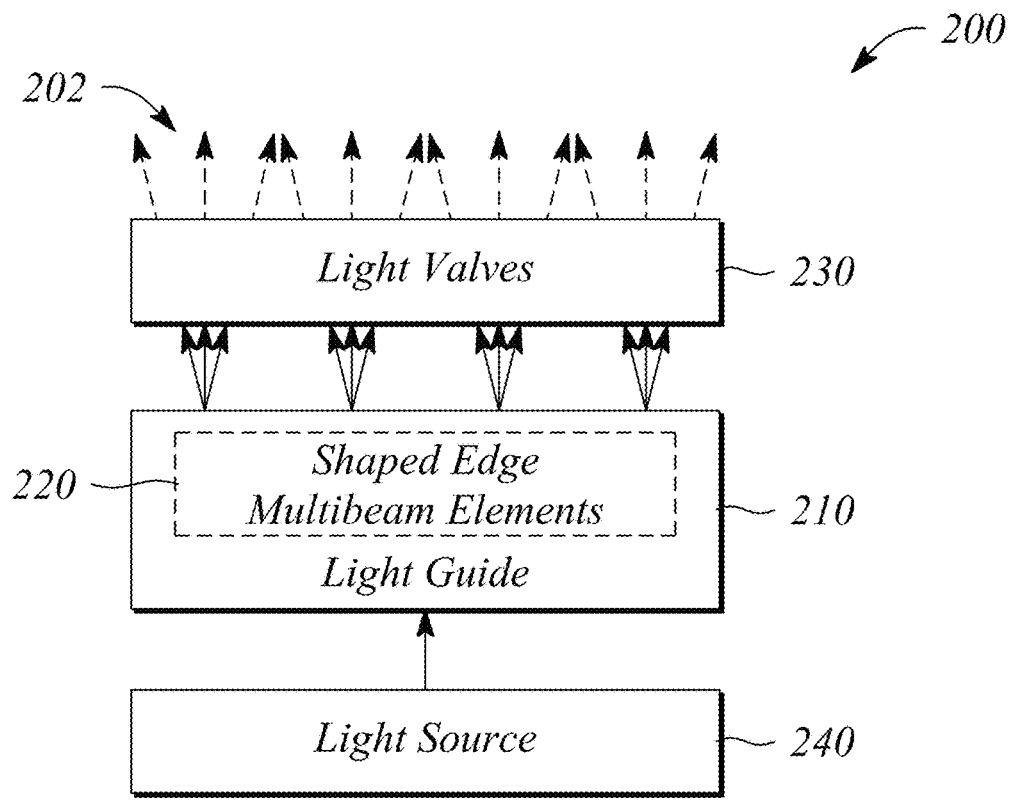
FIG. 7 illustrates a block diagram of a multiview display in an example, according to an embodiment consistent with the principles described herein.

According to some embodiments of the principles described herein, a multiview display is provided. FIG. 7 illustrates a block diagram of a multiview display 200 in an example, according to an embodiment consistent with the principles described herein. As illustrated, the multiview display 200 comprises a light guide 210 configured to guide light in a propagation direction along a length of the light guide 210 as guided light. According to some embodiments, the light guide 210 may be substantially similar to the light guide 110 of the multibeam backlight 100, described above. As such, the light guide 210 is configured to guide the guided light using total internal reflection. Further, the guided light may be guided at a non-zero propagation angle by or within the light guide 210. In some embodiments, the guided light may be collimated or may be a collimated light beam. In particular, the guided light may be collimated according to or having a predetermined collimation factor σ, in various embodiments.

The multiview display 200 further comprises an array of multibeam elements 220 spaced apart from one another across the light guide 210. In some embodiments, multibeam elements 220 of the multibeam element array may be substantially similar to the multibeam elements 120 of the above-described multibeam backlight 100. In particular, the multibeam elements 220 of the multibeam element array are configured to scatter out guided light from the light guide 210 as directional light beams 202 (i.e., emitted light) having directions corresponding to view directions of the multiview display 200. The multibeam elements 220 of the multibeam element array may be located on surface of or within the light guide 210, according to various embodiments.

Further, a multibeam element 220 of the multibeam element array has an edge oriented substantially orthogonal to the propagation direction of the guided light, according to various embodiments. The edge of the multibeam element 220 comprises a first section having a first tangent oblique to the propagation direction and second section having a second tangent oblique to the first tangent. As a result of this orientation, neither section is normal or orthogonal to the guided light, but instead both sections are oblique to the guided light. Thus, the edge of the multibeam element 220 may be referred as a shaped edge, according to various embodiments.

According to various embodiments, the first and second sections of the shaped edge of the multibeam element 220 of the multibeam element array are configured to disperse spurious diffraction components scattered out by the shaped edge of the multibeam element 220. In particular, the orientation of the first and second sections of the edge both relative to one another and relative to the propagation direction of the guided light is configured to disperse the spurious diffraction components. Since the first and the second sections are oblique to one another, the spurious diffraction components emitted by a first section propagates in a different direction that the spurious diffraction component emitted by second section oblique to the first. As a result, the spurious diffraction component of the emitted light comprising the directional light beams 202 may be dispersed such that it is spread out in angular space instead of being confined to a specific plane or direction as with the spurious diffraction component caused by an edge of the multibeam element 220 orthogonal to the propagation direction.

In some embodiments, one or both of the first and second sections of the edge of the multibeam element 220 has one or both of a sinusoidal shape and a triangular shape in a plane of the light guide 210. Referring to the multibeam element 120 illustrated in FIG. 4B as being illustrative of the multibeam element 220, both sections of the edge of the multibeam element 120 have a sinusoidal shape, for example. Similarly, as illustrated in FIG. 4C, both sections of the shaped edge of the multibeam element 220 may have a triangular shape, which may represent the multibeam element 220 with first and second sections of the edges having a triangular shape, for example.

In some embodiments, the multibeam element 220 of the multibeam element array comprises a scattering structure and a reflective island aligned with the scattering structure. Further, the reflective island may have a size that is comparable (i.e., about the same size as) a size of the scattering structure. The scattering structure is configured to scatter out of the light guide 210 a portion of the guided light as the plurality of directional light beams 202 or equivalently the emitted light. In various embodiments, the reflective island may be comprise any of a variety of reflective materials, layers, or films including, but not limited to, a metal, various polymer-metal composites (e.g., an aluminum-polymer), a Bragg reflector, and enhanced specular reflectors (ESR) film. In some embodiments, one or both of the scattering structure and the reflective island may be substantially similar to the above-described scattering structure 122 and reflective island 128, respectively.

In particular, in some embodiments, the shaped edge of the multibeam element 220 having a shape configured to disperse the spurious diffraction components comprises an edge of the scattering structure, e.g., as illustrated in and described above with reference to FIG. 5B. In other embodiments, the shaped edge of the multibeam element 220 configured to disperse the spurious diffraction components comprises an edge of the reflective island, e.g., as illustrated in and described above with reference to FIG. 5C. In yet other embodiments, the shaped edge of the multibeam element 220 configured to disperse the spurious diffraction components comprises edges of both the scattering structure and the reflective island, e.g., as illustrated in and described above with reference to FIG. 5D.

Further, in some embodiments, the multibeam element 220 of the multibeam element array comprises a first scattering structure and a second scattering structure, the first scattering structure being independent from and adjacent to the second scattering structure. For example, the multibeam element 220 may be substantially similar to the multibeam element 120 illustrated in and described above with respect to FIG. 6A-6B.

As illustrated in FIG. 7, the multiview display 200 further comprises an array of light valves 230. In some embodiments, the array of light valves 230 may be substantially similar to the array of light valves 140 described above with respect to the multibeam backlight 100. In particular and according to various embodiments, any of a variety of different types of light valves may be employed as the light valves 230 of the light valve array including, but not limited to, one or more of liquid crystal light valves, electrophoretic light valves, and light valves based on electrowetting. The array of light valves 230 is configured to modulate the directional light beams 202 to provide a multiview image, according to various embodiments.

In some embodiments (e.g., as illustrated in FIG. 7), the multiview display 200 may further comprise a light source 240 optically coupled to an input of the light guide 210, the light source 240 being configured to provide light to be guided in the light guide 210 as guided light one or both of having a non-zero propagation angle and being collimated according to a predetermined collimation factor. In some embodiments, the light source 240 may be substantially similar to the light source 130 of the multibeam backlight 100, described above.

Figure 8:
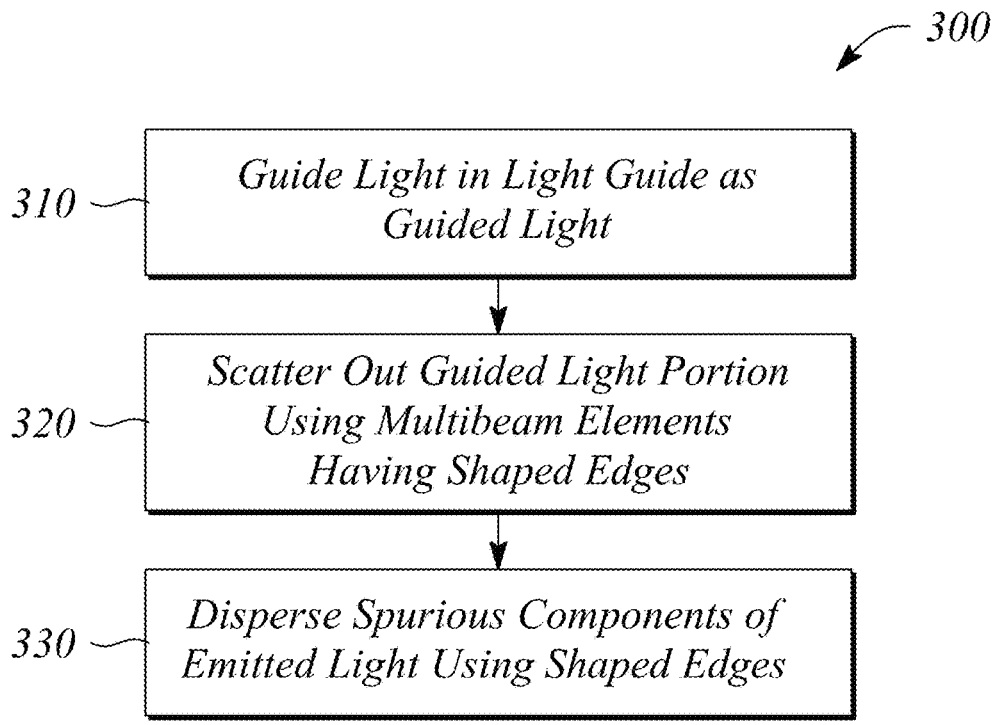
FIG. 8 illustrates a flowchart of a method 300 of multiview display in an example, according to an embodiment consistent with the principles described herein.

In accordance with some embodiments of the principles described herein, a method of multiview display operation is provided. FIG. 8 illustrates a flowchart of a method 300 of multiview display in an example, according to an embodiment consistent with the principles described herein. The method 300 of multiview display operation comprises guiding light 310 in a propagation direction along a length of a light guide as guided light. In some embodiments, the light guide may be substantially similar to the light guide 110 of the above-described multibeam backlight 100. In particular, the light guide is configured to guide the guided light using or according to total internal reflection. Further, the guided light may be guided by or within the light guide one or both of at a non-zero propagation angle and according to a predetermined collimation factor.

The method 300 of multiview display operation illustrated in FIG. 8 further comprises, scattering out 320 a portion of the guided light as emitted light using a multibeam element of a plurality of multibeam elements spaced apart from one another across the light guide. In some embodiments, the multibeam element used in scattering 320 may be substantially similar the multibeam element 120 described above with respect to the multibeam backlight 100. In particular, multibeam elements of the multibeam element plurality are separated from one another by a finite space and represent individual, distinct elements along or across the light guide length. Further, a multibeam element of the multibeam element plurality may be configured to emit light as a plurality of directional light beams having principal angular directions. The different principal angular directions of the plurality of light beams may correspond to respective different view directions of the multiview display, in some embodiments.

Further, in various embodiments, the multibeam element comprises a shaped edge that is orthogonal to the propagation direction. The shaped edge may comprise a shape characterized as concave curved line, a curved line of another shape, a plurality of intersecting straight lines, a sinusoidal shape, or a triangular shape, for example. As such, scattering 320 a portion of the guided light as emitted light uses multibeam elements having shaped edges, in various embodiments.

The method 300 further comprises dispersing 330 spurious diffraction components of the emitted light using the shaped edge of the multibeam element, the spurious diffraction components being produced by an interaction between the guided light and the multibeam element. In particular, the shaped edge of the multibeam element, according to various embodiments, serves to minimize a length of multibeam element edge that is orthogonal to the direction of propagation of the guided light, and therefore functions to disperse the spurious diffraction component in a variety of directions, e.g., as was previously described above with reference to the multibeam backlight 100 and the multiview display 200.

In some embodiments, the shaped edge of the multibeam element used in dispersing 330 spurious diffraction components comprises a plurality of sections having intersecting tangents that are oblique to the propagation direction of the guided light. As a result of this orientation of each section with respect to the guided light, the sections are oblique and thus generally not orthogonal to the guided light. Further, because each section is oblique to at least one other section, the spurious diffraction components emitted by a first section propagates in a different direction that the spurious diffraction component emitted by second section oblique to the first, in various embodiments. As a result, the spurious diffraction component of the emitted light may be dispersed 330 such that it is spread out in angular space instead of being confined to a specific plane or direction as with the spurious diffraction component caused by an edge of the multibeam element orthogonal to the propagation direction In some embodiments, the multibeam element comprises a scattering structure and a reflective island aligned and co-extensive with the diffraction grating, i.e., the reflective island has size that is comparable to a size of the scattering structure. The scattering structure is configured to scatter out of the light guide a portion of the guided light as the plurality of directional light beams. In various embodiments, the reflective island may comprise, but is not limited to, a reflective metal, various polymer-metal composites, a Bragg reflector, an enhanced specular reflectors (ESR) film, or other suitable materials, layers, or films. In some embodiments, the shaped edge of the multibeam element comprises an edge of the scattering structure. In other embodiments, the shaped edge of the multibeam element comprises an edge of the reflective island. In yet other embodiments, the shaped edge of the multibeam element may comprise an edge of both of the scattering structure and the reflective island. In various embodiments, the scattering structure may comprise, but is not limited to, one or more of a diffraction grating that diffractively scatters 320 out the guided light portion, a micro-refractive element that refractively scatters 320 out the guided light portion, and a micro-reflective element that reflectively scatters 320 out the guided light portion.

Thus, there have been described examples and embodiments of a multibeam backlight, a multiview display, and a method of multiview display operation that employ a multibeam element having a shaped edge comprising a shape configured to disperse spurious diffraction components in the emitted light associated with an interaction between the guided light and the multibeam element. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multibeam backlight comprising:
   a light guide configured to guide light in a propagation direction along a length of the light guide as guided light, and
   a plurality of multibeam elements spaced apart from one another across the light guide and configured to scatter out the guided light as emitted light, a multibeam element of the multibeam element plurality having a shaped edge oriented orthogonal to the propagation direction,
   wherein a shape of the shaped edge of the multibeam element is configured to disperse spurious diffraction components in the emitted light associated with an interaction between the guided light and the multibeam element.

2. The multibeam backlight of claim 1, wherein the shaped edge comprises a plurality of sections having intersecting tangents oblique to the propagation direction of the guided light within the light guide.

3. The multibeam backlight of claim 1, wherein the shape of the shaped edge is sinusoidal.

4. The multibeam backlight of claim 1, wherein the shape of the shaped edge is triangular.

5. The multibeam backlight of claim 1, wherein the multibeam element comprises a scattering structure, the scattering structure comprising one or more of a diffraction grating, a micro-reflective element, and a micro-refractive element.

6. The multibeam backlight of claim 5, wherein the multibeam element further comprises a reflective island aligned with and having a comparable size to the scattering structure.

7. The multibeam backlight of claim 6, wherein the shaped edge comprises one or both of an edge of the scattering structure and an edge of the reflective island.

8. The multibeam backlight of claim 1, wherein the multibeam element comprises a plurality of scattering structures independent from and adjacent to one another and arranged in an array of scattering structures within the multibeam element, each scattering structure having a shaped edge.

9. The multibeam backlight of claim 1, further comprising a light source optically coupled to an input of the light guide, the light source being configured to provide light to be guided in the light guide as guided light one or both of having a non-zero propagation angle and being collimated according to a predetermined collimation factor.

10. A multiview display comprising the multibeam backlight of claim 1, the multiview display further comprising an array of light valves configured to modulate the emitted light to provide a multiview image.

11. The multiview display of claim 10, wherein the emitted light comprises a plurality of directional light beams having directions corresponding to view directions of the multiview image and wherein a size of the multibeam element is comparable to a size of a light valve of the array of light valves used to modulate the directional light beams to provide the multiview image.

12. A multiview display comprising:
   a light guide configured to guide light in a propagation direction along a length of the light guide as guided light;
   an array of multibeam elements spaced apart from one another across the light guide and configured to scatter out the guided light as a plurality of directional light beams having directions corresponding to view directions of the multiview display, a multibeam element of the multibeam element array having an edge oriented substantially orthogonal to the propagation direction of the guided light and comprising a first section having a first tangent oblique to the propagation direction and second section having a second tangent oblique to the first tangent; and
   an array of light valves configured to modulate the directional light beams to provide a multiview image,
   wherein the first and second sections of the edge are configured to disperse spurious diffraction components scattered out by the edge of the multibeam element.

13. The multiview display of claim 12, wherein one or both of the first and second sections of the edge of the multibeam element has one or both of a sinusoidal shape and a triangular shape in a plane of the light guide.

14. The multiview display of claim 12, wherein the multibeam element comprises a scattering structure and a reflective island aligned with the scattering structure and having a comparable size to the scattering structure.

15. The multiview display of claim 14, wherein the edge comprises one or both of an edge of the scattering structure and an edge of the reflective island.

16. The multiview display of claim 12, wherein the multibeam element further comprises a first scattering structure and a second scattering structure, the first scattering structure being independent from and adjacent to the second scattering structure, each scattering structure having the edge comprising the first and second section.

17. The multiview display of claim 12, further comprising a light source optically coupled to an input of the light guide, the light source being configured to provide light to be guided in the light guide as guided light one or both of having a non-zero propagation angle and being collimated according to a predetermined collimation factor,
  wherein the light source comprises a plurality of optical emitters and the edge comprising the first and second sections is configured to mitigate striping associated with the light source.

18. A method of multiview display operation comprising:
  guiding light in propagation direction along a length of a light guide as guided light;
  scattering out a portion of the guided light as emitted light using a multibeam element of a plurality of multibeam elements spaced apart from one another across the light guide, the multibeam element comprising a shaped edge that is orthogonal to the propagation direction; and
  dispersing spurious diffraction components of the emitted light using the shaped edge of the multibeam element, the spurious diffraction components being produced by an interaction between the guided light and the multibeam element.

19. The method of multiview display operation of claim 18, wherein the shaped edge comprises a plurality of sections having intersecting tangents that are oblique to the propagation direction of the guided light.

20. The method of multiview display operation of claim 18, wherein the multibeam element comprises a scattering structure and a reflective island aligned with and having a size comparable to the scattering structure, and wherein the shaped edge comprises one or both of an edge of the scattering structure and an edge of the reflective island.

* * * * *